Feb. 19, 1952 A. PICK 2,586,710
EDUCATIONAL DEVICE
Filed March 15, 1949 2 SHEETS—SHEET 1

Inventor
Arnost Pick
by Karl Michaels atty.

Feb. 19, 1952

A. PICK 2,586,710

EDUCATIONAL DEVICE

Filed March 15, 1949

Inventor
Arnost Pick
by Karlik Chailis, atty.

Patented Feb. 19, 1952

2,586,710

UNITED STATES PATENT OFFICE 2,586,710

EDUCATIONAL DEVICE

Arnost Pick, New York, N. Y., assignor to J. W. Spear & Sons Limited, Enfield, Middlesex, England, a British company Application March 15, 1949, Serial No. 81,510
In Great Britain March 17, 1948

7 Claims. (Cl. 35—9)

This invention relates to educational devices of the question and answer type and more especially to the devices called "electrical questioners," in which various question and answer cards can be placed on a network of conductors hidden from view, each of which connects a pair of spaced contacts. Contact making elements of an indicating circuit, for instance a lamp circuit, can be inserted in a question card and an answer card, the lighting of the lamp showing whether the student knew the correct answer electrically connected to the question.

The present invention improves this type of educational device or game in several respects.

It renders it practically impossible for the student to memorize the location of the two contacts which are allotted to a question and its answer.

It increases to an almost unlimited extent the number of pairs of questions and answers which can be accommodated on the limited area available in a game of this sort.

It renders it possible to use multiple-answer cards, as explained farther below.

It can be manufactured and sold, in spite of these improvements and advantages, at a materially lower price than other devices of a similar kind.

I will now describe by way of example one embodiment of this invention shown in a diagrammatic manner on the drawing affixed to this specification and forming part thereof.

In the drawing

Figure 1:
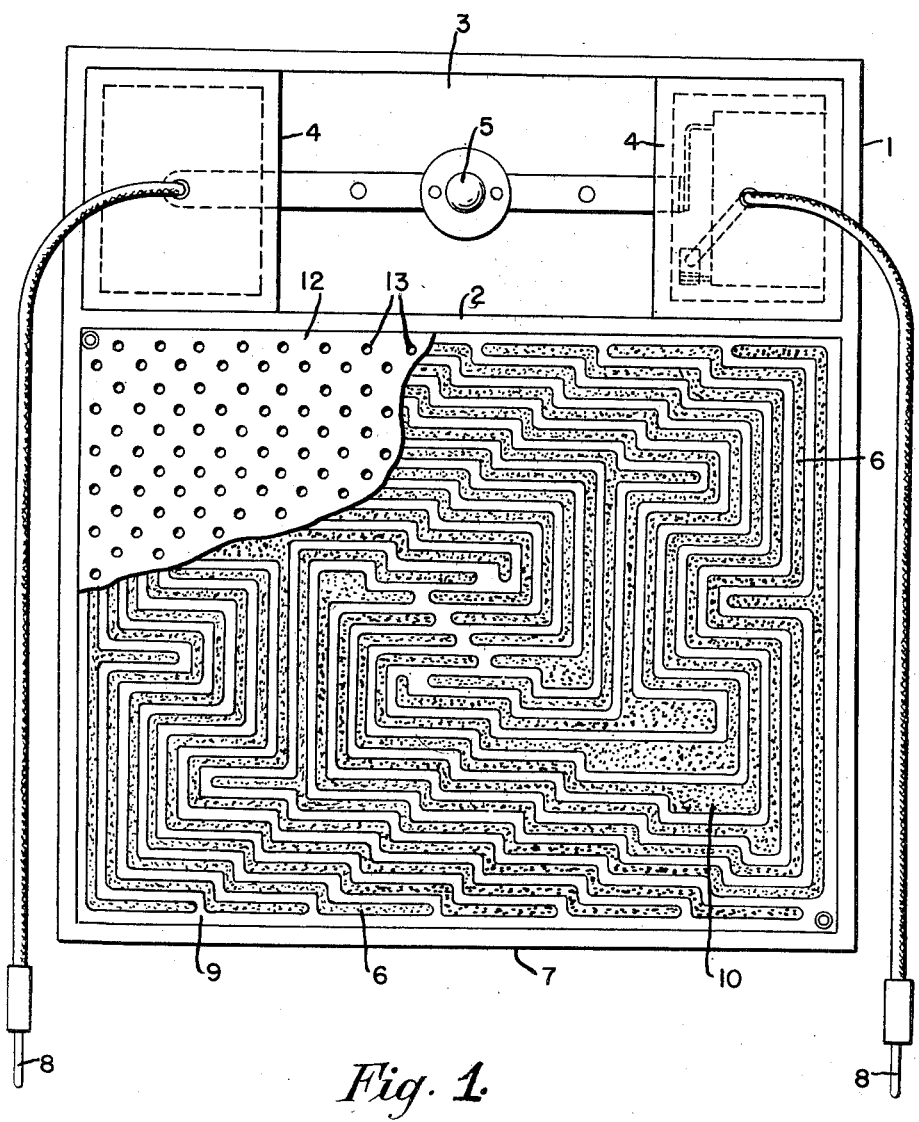
Fig. 1 is a plan view of the game board including the indicating device.

In known devices of the kind defined above the question and answer cards to be used have the pictures of different persons, objects, articles or the like printed in one section, and the names of the illustrated persons, objects etc. in another section of the card. Next to each name and next to each picture a hole or perforation is provided through which contact can be established with conductors connecting the pictures with their names.

The drawing shows a box 1 divided by a partition 2 into a compartment 3 housing two dry-cells 4 which supply a circuit including a lamp 5 and the conductors 6 in the compartment 7 with current, whenever the two contact pins 8 are inserted into the two perforations near a picture and near its name which are electrically connected by a conductor 6.

To these well-known features the present invention adds major improvements, one being the nature and arrangement of the conductors connecting question and answer contacts, while another is the means for hiding these conductors from view and rendering any memorizing of connected points impossible.

In the compartment 7 is mounted a board or card 9 according to this invention, showing a number of electrically conductive contact strips 6, each one presenting a great number of differently located electrically connected contact points. Each strip extends in more than one direction over a large area of the board surface and, in the example shown in the drawing, its length is increased by the meandering pattern along which it extends. Each strip here extends in parallel to several or all other strips. All strips are conductive throughout their entire surfaces. Consequently a contact can be established substantially at any point between their ends. No strip is electrically connected with another one, but insulated from all other strips, and no strip crosses another strip.

It should be understood that the particular embodiment here described and shown in the drawing is only a preferred embodiment insofar as the length and irregular pattern of individual strips is concerned. Nested circular, oval, U-shaped or angular patterns, while perhaps somewhat less effective, should also be considered as falling into the orbit of this invention.

All known methods of conductor production, including metal line printing and electrolytic depositing of metal on insulating supports can be used in the low-price production of the network of contact-conductors.

The combination, with the narrow strips 6, of enlarged areas such as shown for instance at 10, will help increase the available contact area and the irregularity of the pattern, which renders memorizing impossible.

The contact board or card preferably consists of some low-priced insulating material such as paper, cardboard, wood, plastics etc. A particularly simple and low-priced kind of conductor consists of paper strips glued to the board and having their free surfaces coated with metal, being for instance covered with metal foil. Adjoining strips are spaced all over their length and thereby insulated from each other.

By nesting the strips, the limited surface area of the board is utilized to the greatest extent. Their irregularity of form renders it impossible for the student to keep in mind the location of the many contact points each hidden strip offers.

The hiding of the strips is effected by a cardboard or other covering 12 perforated in many places, all of its perforations 13 registering with a strip and each strip extending in register with more than two and preferably with a great number of perforations.

Figure 2:
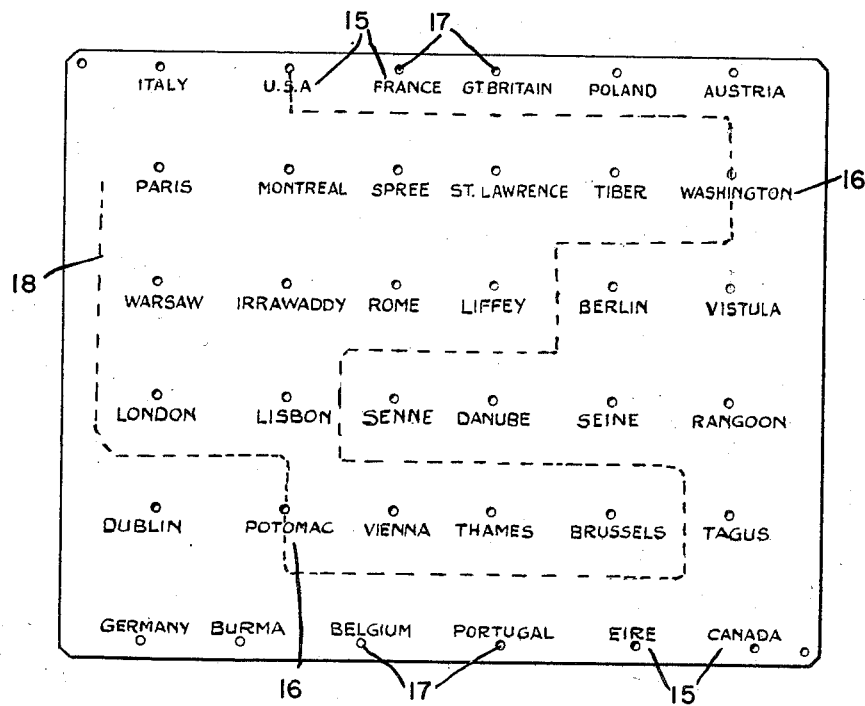
Fig. 2 illustrates a multi-answer card adapted for use with the new board.

The many facilities of contact making offered by the new board can be exploited to great advantage by using a great number of different cards and also multi-answer cards, to be placed on the cover 12. An example of a multi-answer card is shown in Fig. 2 which allows for instance the question to be posed of the name of the capital of a State and also the river on which the capital is situated. The names of the States are shown in a question position at 15, each name being associated with one conductor, and the names of the capital and of its river in a different position at 16, associated with the same conductor, the latter being indicated in dotted lines at 18, as being one of the conductors on the board. 17, 17 are the perforations next to the names which, when the card is placed on the covering 12, will register with perforations 13 of the covering and enable the contact pins to contact the strip 18 which connects the three of them.

I claim:

1. An educational device comprising a plate having a labyrinth pattern of individual contact strips varying in length and tortuously disposed in nested array on the face of said plate, said strips being electrically conductive and forming respective continuous exposed contact areas, an insulating plate overlaying said strip pattern and having a plurality of perforations therethrough registering with respective strips so as to provide access to each of said strips through a plurality of selective pairs of perforations for establishing a series circuit through the respective included portions thereof.

2. A device as set forth in claim 1, wherein said perforations in said insulating plate are disposed in a symmetrical arrangement.

3. A device as set forth in claim 2, including a question-answer card superimposable on said perforated plate and having pairs of perforations therethrough registerable with predetermined selective pairs of perforations of said perforated plate, said pairs of perforations on said card signifying questions and respective answers thereto.

4. In a device as set forth in claim 1, including a question-answer card superimposable on said perforated plate and having pairs of perforations therethrough registerable with predetermined, selective pairs of perforations of said perforated plate, said pairs of perforations on said card signifying questions and respective answers thereto.

5. A device as set forth in claim 1, wherein certain of said strips comprise relatively widened areas.

6. A device as set forth in claim 1, wherein certain of said strips have relatively short branch strips extending angularly therefrom.

7. A device as set forth in claim 1, wherein said pattern is made more complex by providing various strips with relatively widened areas and also with relatively short branch strips extending angularly therefrom.

ARNOST PICK.

REFERENCES CITED

The following references are of record in the file of this patent:

UNITED STATES PATENTS

| Number | Name | Date |
| --- | --- | --- |
| 1,647,276 | Daman | Nov. 1, 1927 |
| 1,686,105 | Rothenberg | Oct. 2, 1928 |
| 1,810,529 | Rice | June 16, 1931 |
| 1,949,783 | Cleaver | Mar. 6, 1934 |
| 2,139,860 | Schwendenman | Dec. 13, 1938 |
| 2,148,259 | Cisin | Feb. 21, 1939 |
| 2,149,459 | Morehouse | Mar. 7, 1939 |

FOREIGN PATENTS

| Number | Country | Date |
| --- | --- | --- |
| 251,906 | Switzerland | Sept. 1, 1948 |

OTHER REFERENCES

Bureau of Standards Circular #468, November 15, 1947.

Product Engineering, pages 141–143, April 1948.